June 16, 1936. P. R. GLASS 2,044,289
FOLDING MACHINE
Filed Aug. 10, 1933 7 Sheets-Sheet 3

Patented June 16, 1936

2,044,289

UNITED STATES PATENT OFFICE 2,044,289

FOLDING MACHINE

Perley R. Glass, Salem, Mass., assignor to United Shoe Machinery Corporation, Paterson, N. J., a corporation of New Jersey Application August 10, 1933, Serial No. 684,542

21 Claims. (Cl. 12—54)

This invention relates to folding machines and is herein illustrated as embodied in a machine for folding the margins of pieces of sheet material which are to be used in the manufacture of boots and shoes.

In the manufacture of women's shoes, it is common to provide ornamental openings in parts of the uppers thereof. It is desirable in some instances to fold the margins along the edges of these openings, but such folding has hitherto been done only by a manual operation which added considerably to the expense of manufacture.

According to one feature of the present invention, a machine is provided by which this operation may be performed. The illustrated machine has a post of small cross-section over which the work is fed, there being a free and unobstructed space around said post to permit a piece of work to be swung freely, and an arm which overhangs the top of the post. Mounted on the post and on the arm are a plurality of work-engaging parts including a stationary edge gage and an anvil mounted on the post and a hammer and a presser mounted on the arm, means being provided for lifting the presser to permit a piece of work having an ornamental opening therein to be slipped beneath the lifted presser sufficiently to allow the opening in the work to be threaded over the stationary gage. With the work in this position, the margin of the opening is fed past the folding and fold-pressing members by the hammer and anvil until the entire margin has been folded, whereupon the presser is lifted once more to permit the work to be removed from the machine.

In folding the margin of a piece of work, it is common to form the fold prior to the pressing or hammering thereof by the action of a creaser and a cooperating folder; and it is desirable that the folder should draw the margin of the work tightly about the edge of the creaser and lay it smoothly over the creaser. To this end, in accordance with another feature of the invention, the folder first moves substantially straight up past the edge of the creaser and then changes its direction of movement and moves over the creaser. In the illsutrated construction, these movements of the folder are brought about by mounting the folder on a pivot which is moved bodily up, and about which, at the proper time, the folder is swung.

The stop mechanism and clutch herein described are claimed in the divisional application Serial No. 728,237, filed May 31, 1934, in my name.

These and other features of the invention including certain details of construction and combinations of parts will be described as embodied in the illustrated machine and pointed out in the appended claims.

Referring now to the accompanying drawings.

Figure 2:
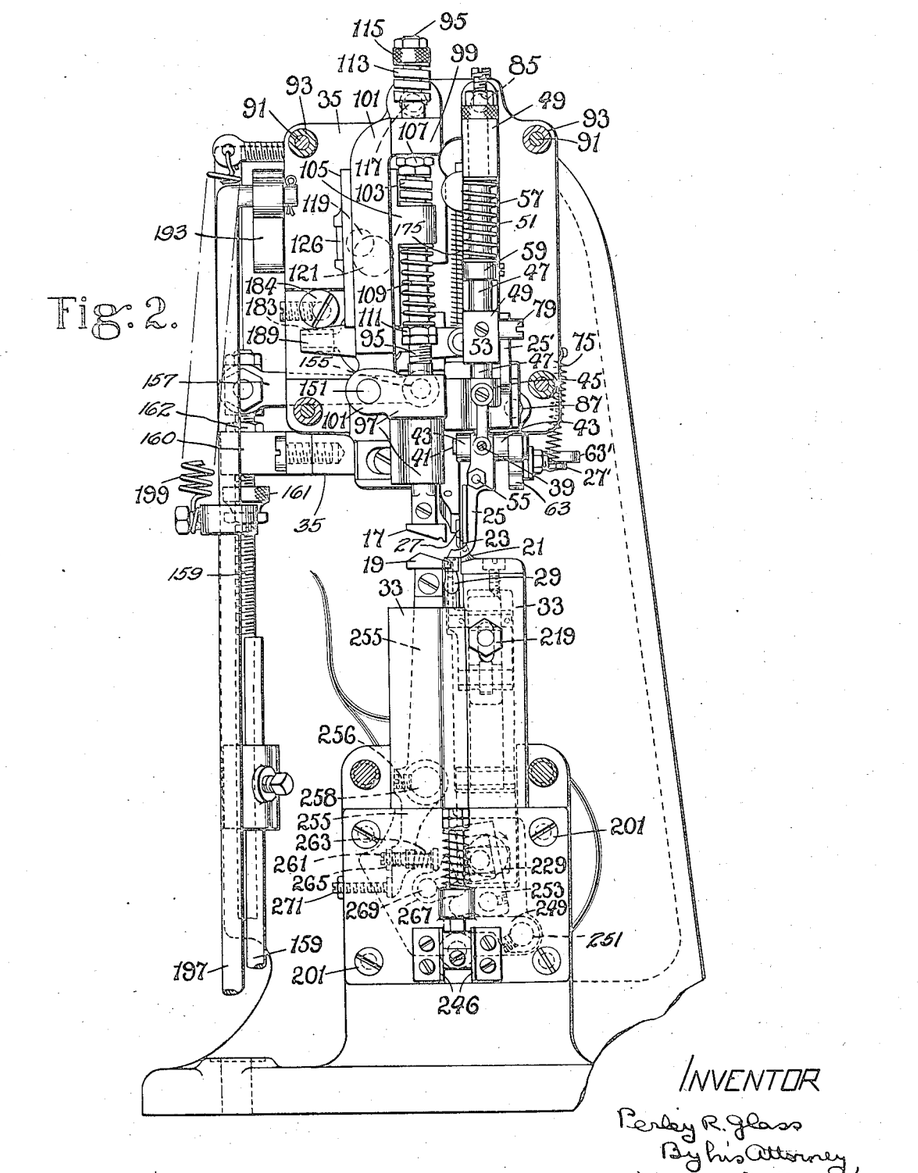
Fig. 2 is an end elevation, the cover plate at the outer end of the overhanging arm having been removed.
Figure 3:
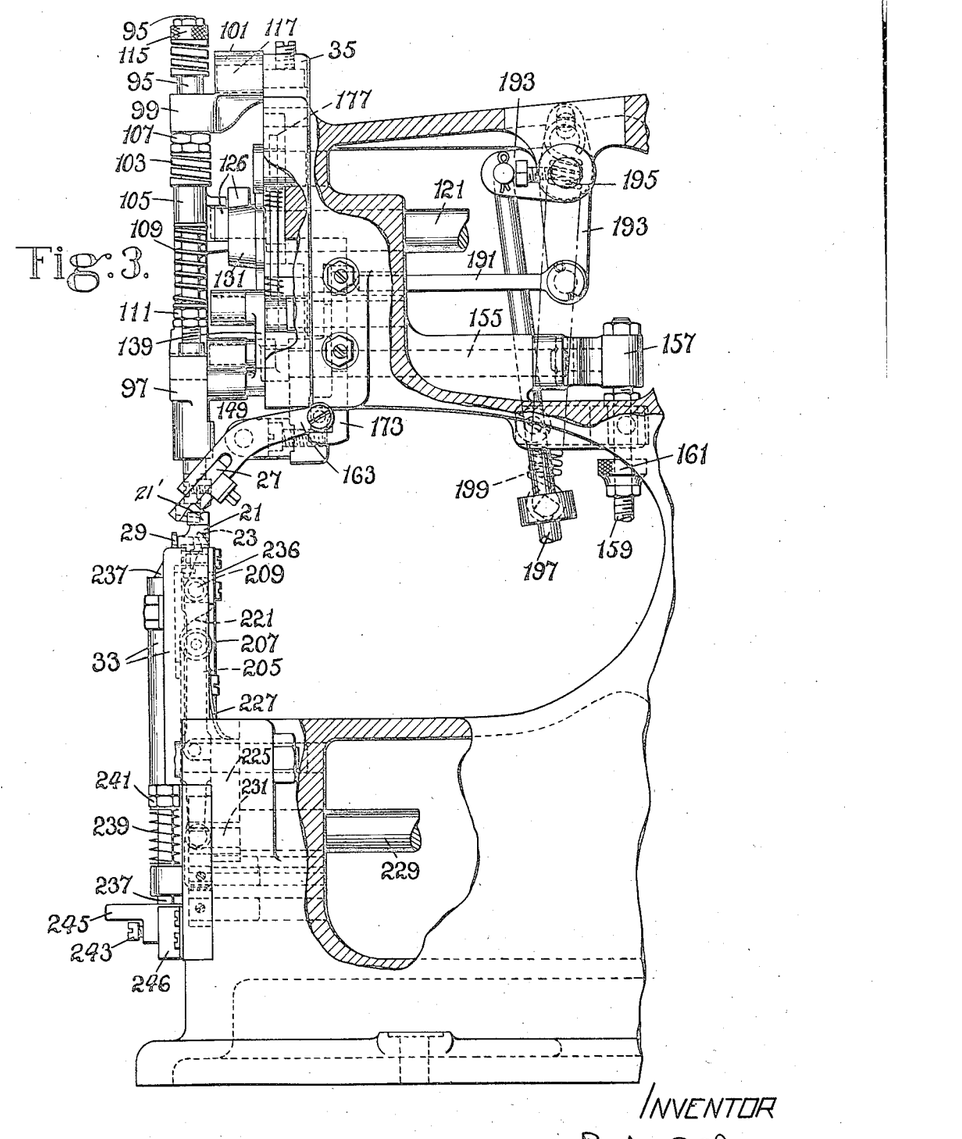
Fig. 3 is a front elevation of a portion of the machine, the gage finger and creaser foot having been omitted, and certain parts having been broken away.

Referring first to Figs. 2 and 3, the work is fed intermittently from right to left, as viewed in Fig. 2, and away from the observer, as viewed in Fig. 3, by a cooperating hammer 17 and anvil 19, the hammer moving substantially in the path of a flattened ellipse and the anvil swinging back and forth in a flat arc. Referring to Fig. 2, the hammer moves down to press the fold against the anvil and then to the left to feed the work, in which left-hand movement it carries the anvil with it. The hammer then rises and returns with the anvil to the position shown. As the work is fed intermittently, a preliminary upward bend is imparted to the margin by a gage 21 and then the fold is formed by a folder 23 which bends the upwardly extending margin about the edge of a presser or creaser 25. The hammer or fold-presser 17 then descends, as has been described, to press the fold and to feed the work. It is desirable to snip the margin at times, for example when concavely curved edges are encountered, and to this end a snipping knife 27, which is normally held in the raised inoperative position shown in Fig. 3, may be vibrated, said knife cooperating with a flat vertical face (not shown) on the far side of the gage 21 to produce shear cuts through the upstanding edge of the work. In order to hold the work stationary during the pauses in the intermittent feed movements, a gripper finger 29 (best shown in Fig. 4) engages the under side of the work and holds the work against the under side of the creaser 25. Thus the work is fed intermittently, and the fold is pressed, by the cooperating action of the hammer 17 and the anvil 19. During each feed movement, a preliminary upward bend is imparted to the edge of the moving work by the gage 21, and during each pause the folder bends the upwardly extending margin over the creases to form the fold which is thereupon pressed by the hammer. If at any time it is desired to snip the margin of the work, the snipping knife is thrown into action.

Figure 1:
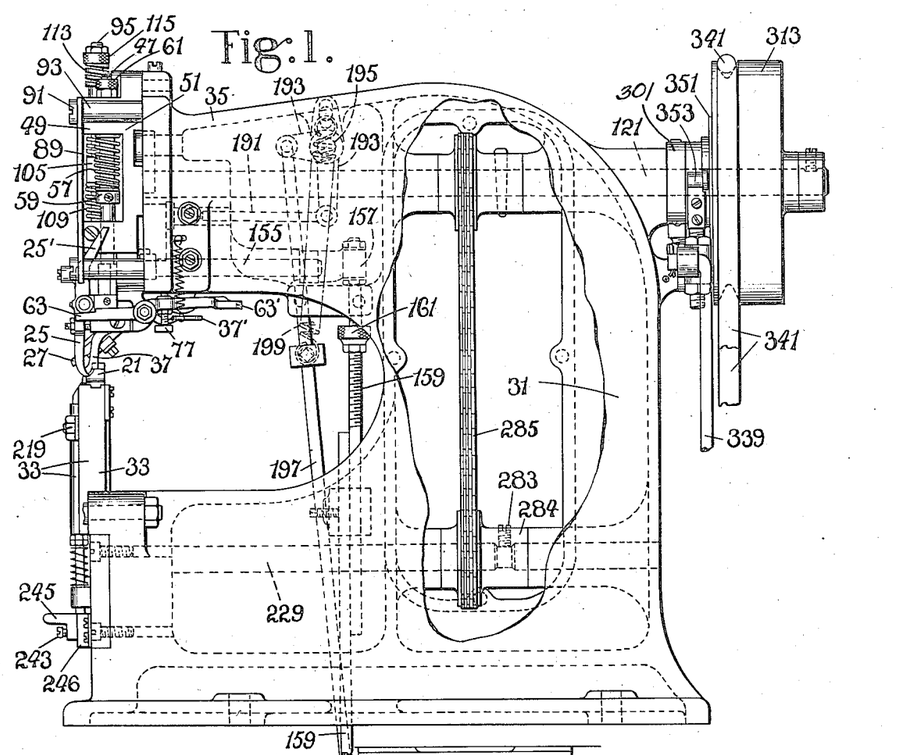
Fig. 1 is a front elevation of a machine in which the present invention is embodied.
Figures 18, 19, 20, 21, 22, 23:
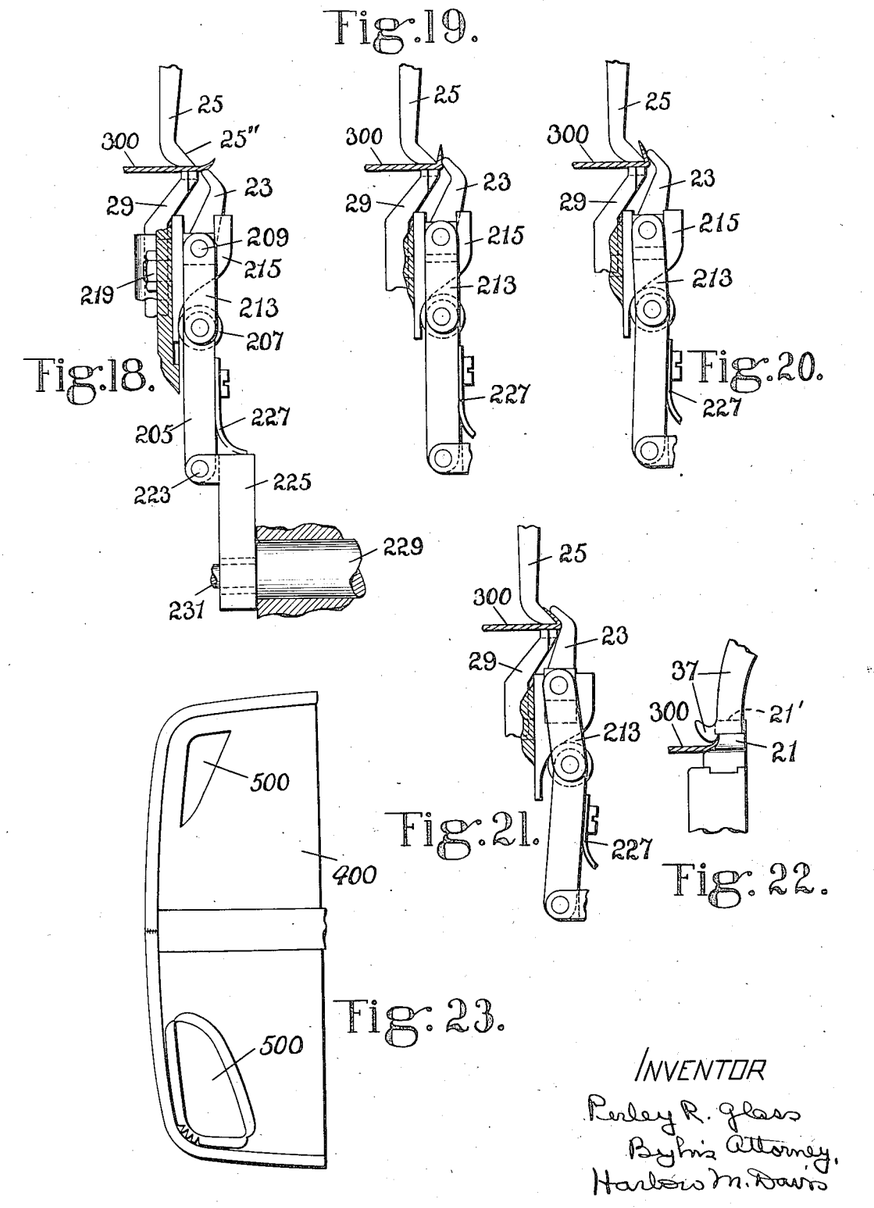
Fig. 18 is a detail principally in elevation showing a piece of work in process of being operated upon.
Figs. 19, 20, and 21 are similar views showing succeeding positions occupied by the work-engaging parts.
Fig. 22 is a detail in elevation showing the positions of certain of the work-engaging parts.
Fig. 23 is a plan of a quarter of the upper of a shoe having ornamental openings, the margin along the edge of one of which has been folded.

Referring now to Fig. 1, the machine comprises a frame 31 having at one end thereof an upright post 33 of small cross-section and also having an arm 35 the outer end of which overhangs the top of the post. The hammer, the creaser, the snipping knife and a gage finger 37 are all carried at the outer end of this overhanging arm. This gage finger rests upon the top of the gage 21 and has a curved end portion which extends alongside the creaser 25 and with that member and the gage guides the bent-up margin of the work as best shown in Fig. 22.

Figure 7:
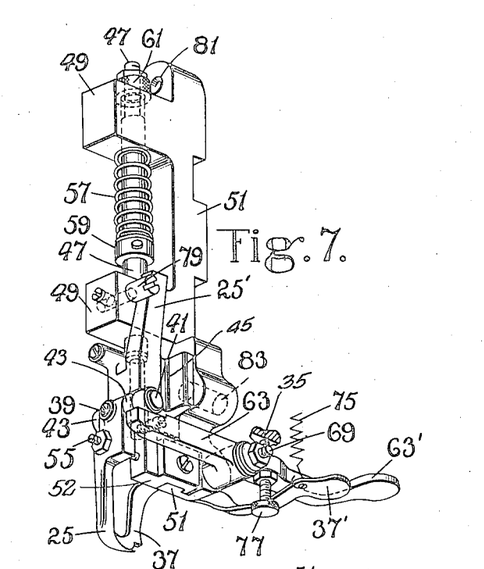
Fig. 7 is a perspective showing the mounting of the creaser or presser and the gage finger used for folding leather or similar sheet material.
Figure 8:
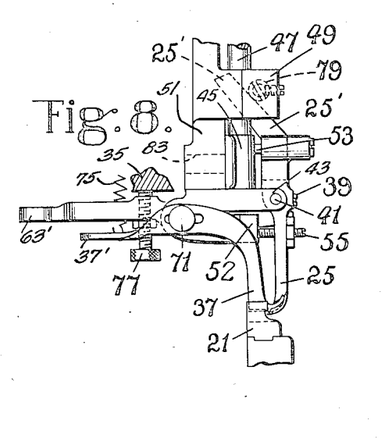
Fig. 8 is an elevation of parts of the mechanism shown in Fig. 7 viewed from the rear, a gage or preliminary bending member having been added.

Referring to Figs. 2, 7, and 8, the stem of the creaser 25 is fastened by a set screw 39 to a small horizontal shaft 41 rotatably mounted in spaced bearings 43 formed on a block 45 which is fast to or rigid with the lower end of a vertical rod 47, said rod being vertically slidable in alined bores in spaced lugs 49 of a carrier 51. The stem of the creaser extends above the level of the horizontal shaft by which it is pivoted and carries a spring-pressed plunger 53 (Fig. 8) which engages the creaser carrier 51 and at all times urges the creaser to rotate about its shaft 41 as far as a stop screw 55 will permit, said screw being threaded through the stem of the creaser and bearing against a block 52 attached to the creaser carrier 51. The creaser is thus held normally in the angular position shown, but this position may be changed by turning the screw 55. The rod 47, at the lower end of which the creaser is carried, is urged downwardly at all times by a compression spring 57 the lower end of which engages a collar 59 adjustably fastened to the rod 47 and the upper end of which engages the under side of one of the lugs 49, a nut 61 being threaded on the upper end of the rod to limit the extent of its downward movement. It is desirable at times to lift the creaser 25, and to this end a small lever 63 having a finger piece 63' at its inner end has its outer end extending beneath a roller upon an extension of the near end of the shaft 41. This small lever 63 near its middle is apertured to receive loosely the stem of a headed sleeve 65 (Fig. 9) said stem also passing through a flange on the creaser carrier 51. On the other side of the flange from that occupied by the lever 63 is the slotted stem of the gage finger 37. In order to clamp the stem of the gage finger 37 and the headed sleeve 65 together and to hold the stem of the headed sleeve rotatably in the bore in the flange of the creaser carrier 51, the stem of a screw bolt 69, having a head 71, passes through a slot in the stem of the gage finger 37 and may be tightened by a small nut 73, the stem of the bolt having an enlarged portion 69' adjacent to the head 71 which fits in the horizontal slot in the stem of the gage finger and bears against the end of the sleeve 65. The space between the head of the sleeve 65 and the adjacent face of the flange on the creaser carrier 51 is such that the lever 63 may be rotated on the stem of the headed sleeve. After the small nut 73 has been loosened, the gage finger 37 may be adjusted horizontally; and when the nut 73 has been tightened, the gage finger is held firmly in adjusted position. The stem of the gage finger 37 has a long bent extension provided with a finger piece 37' which is urged upwardly at all times by a tension spring 75. When it is desired to lift the gage finger, the finger piece is depressed, whereupon the gage finger is swung up about the axis of the headed sleeve 65, the cylindrical stem of which rotates in the bore in the flange of the creaser carrier 51. It should be noted that the bent extension of the stem of the gage finger 37 lies directly below the small lever 63 so that depressing the finger piece 63' lifts both the creaser 25 and the gage finger 37. The spring 75 and a stop screw 77 engaging the frame arm 35 normally hold the lever 63 in the position shown. When the creaser is lifted, it should also be swung out about the axis of the horizontal pivot shaft 41, and to this end the stem of the creaser is provided with an upward extension 25' having an inclined face which contacts with the head of a small screw 79 carried by the lower lug 49. When, therefore, the finger piece 63' is depressed, the gage finger 37 and the creaser 25 are both lifted, and at the same time the creaser is swung out. When this has been done, as will appear below, a piece of work such as that shown in Fig. 23 having an ornamental opening therein may be presented to the machine in position to have the endless edge of the opening folded. Returning now to Fig. 7, the creaser carrier 51 has two bores 81, 83, to receive properly located pins 85, 87 (Fig. 2) fixed in the outer end of the overhanging arm of the frame of the machine. The creaser carrier 51 having been thus located, with its face opposite the lugs 49 abutting a finished surface on the end of the frame arm 35, is held in place on the outer end of the overhanging arm 35 by a flat plate 89 (Fig. 1) which is attached to the arm by screws 91 and spacers 93, said flat plate bearing against the flat outer faces of the lugs 49 (Figs. 2 and 7) of the creaser carrier. This cover plate 89 not only holds the creaser carrier in place but also holds the hammer carrier and part of its operating mechanism in position, as will be described later.

Figures 9, 10, 11, 12, 13:
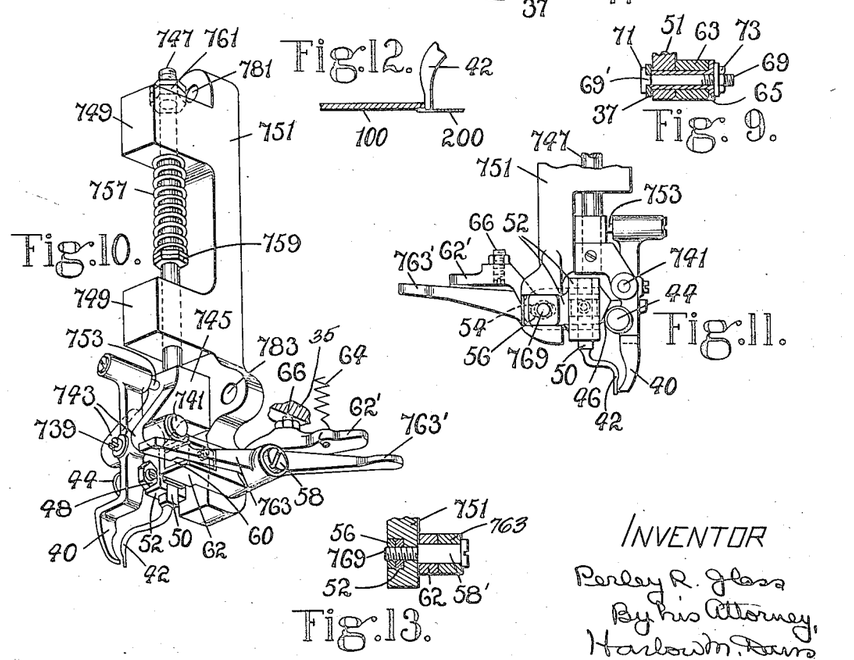
Fig. 9 is a detail in section showing the mounting of the members manipulation of which lifts the creaser and the gage finger.
Fig. 10 is a perspective showing the mounting of the creaser or presser and the gage finger which are used for folding French binding work.
Fig. 11 is an elevation of part of the mechanism shown in Fig. 10 viewed from the rear.
Fig. 12 is a view in section of a piece of French binding work showing how it is engaged by the gage finger.
Fig. 13 is a detail in section showing the mounting of the gage finger and the member for raising the creaser and the gage finger.

The creaser and gage finger unit which is shown in Figs. 7 and 8 is designed for use in folding the edges of leather or fabric. When it is desired to fold what is known as French binding, the unit shown in Figs. 10 and 11 is used. The latter kind of work (Fig. 12) consists of a piece of leather or other sheet material 100 having attached by stitches along an edge thereof one edge of the strip of fabric binding 200, the free portion of which is to be folded about the attached portion and about the edge of the leather. When said work is being folded the gage 21 (Figs. 1, 2) is removed and replaced by a flat plate, and the unit shown in Figs. 7 and 8 is replaced by the French binding unit shown in Figs. 10 and 11. This can be done by removing the cover plate 89, interchanging corresponding carriers 51 and 751 on the pins 85, 87, and replacing the plate 89. Inasmuch as the two units are similar in many respects, those parts of the French binding unit which are the same as, or very similar to, corresponding parts of the leather-folding unit have been given the same reference numerals, increased by seven hundred. In the French binding unit, the creaser 40 is of a somewhat different shape from the creaser 25 of the other unit; and the gage finger 42 is quite different from the gage finger 37, being designed to engage the edge of the leather, as shown in Fig. 12, and to guide the work to the instrumentalities which fold the binding strip about the edge of the leather. The stem of the creaser 40 is fastened by a screw 739 to a short horizontal shaft 741 which is rotatably mounted in alined horizontal bores formed in spaced lugs 743 formed on a block 745. This block is fast to the lower end of a rod 747 which is vertically slidable in alined bearings in spaced lugs 749 of a creaser carrier 751, a spring-pressed plunger 753 urging the creaser at all times to rotate about the axis of the small shaft 741. To determine the extent of this rotary movement, the stem of the creaser 40 carries an eccentric stud 44, the side of which is held against an inclined face 46 formed on a part of the creaser carrier 751, said stud being held in adjusted angular position by a small nut 48. In order to permit the creaser to be lifted, a small lever 763, pivoted about an enlarged portion 58' (Fig. 13) on the stem of a horizontal screw bolt 769, has a finger piece 763' at one end while its other end engages the under side of a roller on the shaft 741. A coiled spring 757 on the vertical rod 747, an adjustable collar 759 and an adjustable stop nut 761 hold the creaser 40 normally in its lowered position as shown. When the finger piece 763' is depressed, the creaser is lifted against the force of the spring 757 and is swung out somewhat against the force of the spring plunger 753 (Fig. 11) by reason of the fact that the eccentric stud 44 rides up the incline 46. The square stem 50 of the gage finger 42 is vertically slidable in a suitable guideway formed in a gage finger carrier 52, the horizontal stem of this carrier 52 having a horizontal slot 54 through which passes the stem of the screw bolt 769, said screw bolt having a squared nut 56 at one end which is received in the same horizontal guideway in the creaser carrier 751 in which the stem of the gage finger carrier 52 is received. The screw bolt 769 at its opposite end has the usual slotted head whereby it may be turned to clamp the gage finger carrier 52 in adjusted horizontal position. In so doing the left-hand end of the enlarged portion 58' on the screw bolt, upon which the hub of the lever 763 and the hub of a second lever, presently to be described, are mounted, is forced against one side of the depending portion of the creaser carrier 751. In order to provide means for holding the gage finger 42 normally in its lower operative position as shown, there is fastened to the stem 50 of the finger so as to extend at right angles thereto a block 60 which is received in a fork at one end of a small lever 62 the hub of which is rotatable upon the enlarged portion 58' upon which the hub of the lever 763 is rotated. A tension spring 64 normally holds the outer end of the lever 62 up in the position shown as far as an adjustable stop screw 66 will permit. With this construction, the creaser may be lifted and swung out by depressing the finger piece 763'; and both the creaser and the gage finger may be lifted and the creaser swung out by depressing the finger piece 62' since one end of the lever 62 overlies one end of the lever 763. The creaser carrier 751 has holes 781, 783, which correspond to the holes 81, 83 of the creaser carrier shown in Figs. 7 and 8 for locating the creaser carrier properly upon the pins 85, 87 carried by the outer end of the overhanging arm 35 of the frame of the machine.

Referring more particularly to Fig. 2, the hammer 17 is fast to the lower end of a rod 95 which is vertically slidable in alined vertical bores in lugs 97, 99 formed on a hammer carrier 101. Encircling the rod 95 is a heavy coiled spring 103 which rests upon a lug formed on a slide 105 which is grooved to receive and is vertically slidable on the hammer carrier, the upper end of the spring engaging a nut 107 on the rod. A second, weaker coiled spring 109 engages the under side of the lug on the slide 105 and rests upon a nut 111 threaded on the rod 95. Thus when the side 105 is moved up and down on the hammer carrier by mechanism presently to be described, the hammer will be raised and lowered and will strike a yielding blow upon the work because of the spring 109. In order that the hammer may not strike the anvil when there is no work in the machine, the upper end of the rod 95 is reduced in diameter to form a shoulder upon which rests a very heavy coiled spring 113 held in place by a nut 115, said spring engaging the top of the lug 99 to arrest further downward movement of the hammer. The hammer carrier 101 is mounted to swing about a stationary pivot 75 pin 117 (Fig. 3) which is carried by the outer end of the overhanging arm 35 of the machine and enters a bore in the hammer carrier. The inner face of the carrier 101 rests against the end face of the arm 35. When the carrier is swung about this pivot it moves back and forth in the line of feed. It is moved up and down, as has been explained, by the slide 105. The hammer may be adjusted up and down by turning the nuts 107, 111 on the vertical rod 95. The swinging of the hammer about its pivot 117 and its up-and-down movements are so timed that the hammer would move in a generally elliptical path if nothing interfered with this movement. Its contact with the work on the anvil 19, however, converts this path into a flattened ellipse in which the hammer descends upon the work, moves to the left with the anvil and then rises and returns to the position shown.

The up-and-down movements of the slide 105 on the carrier 101 are caused by a crank pin 119 on the end of a rotary shaft 121. This crank pin extends into a bore 123 (Fig. 4) in a block 126 in the form of a cross, the horizontal bar of which is received between two horizontal flanges (Fig. 3) which project from the rear of the slide 105. Thus when the shaft 121 is rotated, the slide 105 is moved up and down. The lateral component of the movement of the fold presser or hammer 17 is caused by the same crank pin 119 which acts also to swing a bell-crank lever 127 about a fixed rod 129. The upright arm of the bell-crank lever has a round hole through its upper part and two segmental flanges 131 projecting from opposite sides of the rim of the hole to receive a member 133 (Fig. 6), said member having a vertical groove 135 to receive slidably the upright arm of the cross 126 and a large hole back of the groove through which the crank pin 119 extends. Consequently, rotation of the shaft 121, through the crank pin 119 swings the bell-crank lever 127 about the rod 129 as has been stated. The outer end of the horizontal arm of the bell-crank lever 127 extending to the right has a bore to receive a pin 137 projecting from the upper end of a vertical link 139, the lower end of which has a pin 141. A link 143 having an elongated hub pivoted on a normally fixed but adjustable pin 145 carries at its outer end a pivot pin 147; and the outer end or head of a link 149 has two elongated sockets to receive respectively the pin 141 on the link 139 and the pin 147 on the link 143. This link 149 at its inner end carries a pin 151 which is received in a bore in the lower part of the hammer carrier 101, as best shown in Fig. 2. The fixed but adjustable pivot pin 145 (Fig. 4) is carried by an arm 153 fast to the outer end of a shaft 155 journalled in the frame arm 35 and which may be turned to move the pin 145 into and hold it stationary in various adjusted positions. Assuming that this pin 145 is held stationary in a position in which its axis does not coincide with the axis of the pin 151, rocking of the bell-crank lever 127 moves the link 139 up and down; and this movement, through the pin 141, the head of the link 149 and the pin 147 on the link 143 rocks said link 143 about the pivot 145 which is fixed. The rocking of the link 143 causes the link 149 to oscillate in a path determined by the location of the axis of the pin 145 so that the pin 151 imparts oscillation to the hammer carrier 101 (Fig. 2) about its pivot 117. If the axes of the pin 145 and the pin 151 are in alinement, no oscillation will be imparted to the pin 151 and no oscillatory movement to the hammer carrier 101; and the extent to which the carrier 101 is oscillated depends upon the position into which the pin 145 is adjusted by adjusting the shaft 155.

The shaft 155 (Fig. 1) which carries the pin 145, the position of which determines the amount of lateral oscillation of the hammer and hence the extent of the intermittent feed movements imparted to the work, has fastened to its inner end the hub of an arm 157 to the outer end of which is attached the upper end of a two-part treadle rod 159 guided for up-and-down movement in a bracket 160 (Fig. 2) mounted on the arm 35. A spring, not shown, located beneath the bench on which the machine rests, normally holds the arm 157 down with a stop nut 162 against the bracket 160, in which position the feed of the work is at a maximum. By manipulating a treadle, also not shown, which is attached to the lower end of the rod 159, the arm 157 may be swung up as far as an adjustable stop nut 161 threaded on the rod 159 will permit. In this manner, the rate of feed of the work may be varied at will. The various links and other telescoping members, some of which are shown in separated relation in Fig. 4, are all held telescoped together when they are assembled in final position in the machine; and they are held in this relation by the cover plate 89 (Fig. 1) referred to above which bears against the alined flat front faces of the lugs 97, 99 (Fig. 2) of the hammer carrier 101, thus holding the latter against the arm 35.

The snipping knife (Fig. 4), which cooperates with a vertical face on the far side of the gage 21, is adjustably fastened in a slot in a lever 163 which has a pivot pin 165 extending into a bore in a small block 167 horizontally adjustable in a guideway formed in a part of the frame and held in adjusted position by a screw 169. The lever 163 at its rear end is pivoted at 170 to a block 171 slidably mounted between the branches of a fork at the lower end of a dovetailed slide member 173 mounted in a suitable vertical guideway in the frame of the machine. The slide 173 is normally held stationary in its lower position so as to hold the snipping knife 27 in raised inoperative position by a compression spring 175 on a rod 177 which is vertically slidable in a bore in a pin 179 carried by the frame. The lower end of the rod is pivoted at 181 to a knife-actuating lever 183 the inner end of which is received in a fork at the upper end of the slide 173. The hub of the lever 183 is rotatable on the rod 129, and the outer end of said lever is forked. A stop 184 in the form of a pin having an eccentric head determines the normal position of rest of the forked lever 183. This lever carries a vertical pin 185 about which is pivoted a second lever 187, the far end of which has a latch in the form of a horizontal extension 187' which is rectangular in cross-section, except for two beveled corners. When it is desired to cause the snipping knife to vibrate, this latch is caused to enter a socket in a continually oscillating actuator 189 which is rigid with a bell-crank lever 127. In the position of parts shown, the lever 187 is being held in such angular position about the pin 185 that the latch 187' lies between the branches of the forked end of the lever 183, said lever being so held by a push rod 191 against the force of a compression spring 192 located between the levers 183, 187. The push rod 191 (Fig. 1) is pivoted to the depending vertical arm of a bell-crank lever 193, the hub of which is rotatably mounted on a short horizontal shaft 195; and the horizontal arm of this same bell-crank lever is pivoted to the upper end of a treadle rod 197 which is normally held up by a tension spring 199. The treadle rod 197 and the treadle rod 159 are connected to opposite ends of a toe-and-heel treadle (not shown) the snipping knife being held in inoperative position when the feed is at a maximum. Returning to Fig. 4, the compression spring 192 tends at all times to swing the lever 187 about the pivot 185 but is not effective until the push rod 191 is withdrawn. Even then it may not be effective instantly, depending upon the position of the vibrating actuator 189. The construction is such that the latch 187′ on the end of the lever 187 is in alinement with the socket in the actuator only at the top of the stroke of the actuator when the actuator is reversing its direction of movement and is consequently momentarily stationary.

Figures 4, 5, 6:
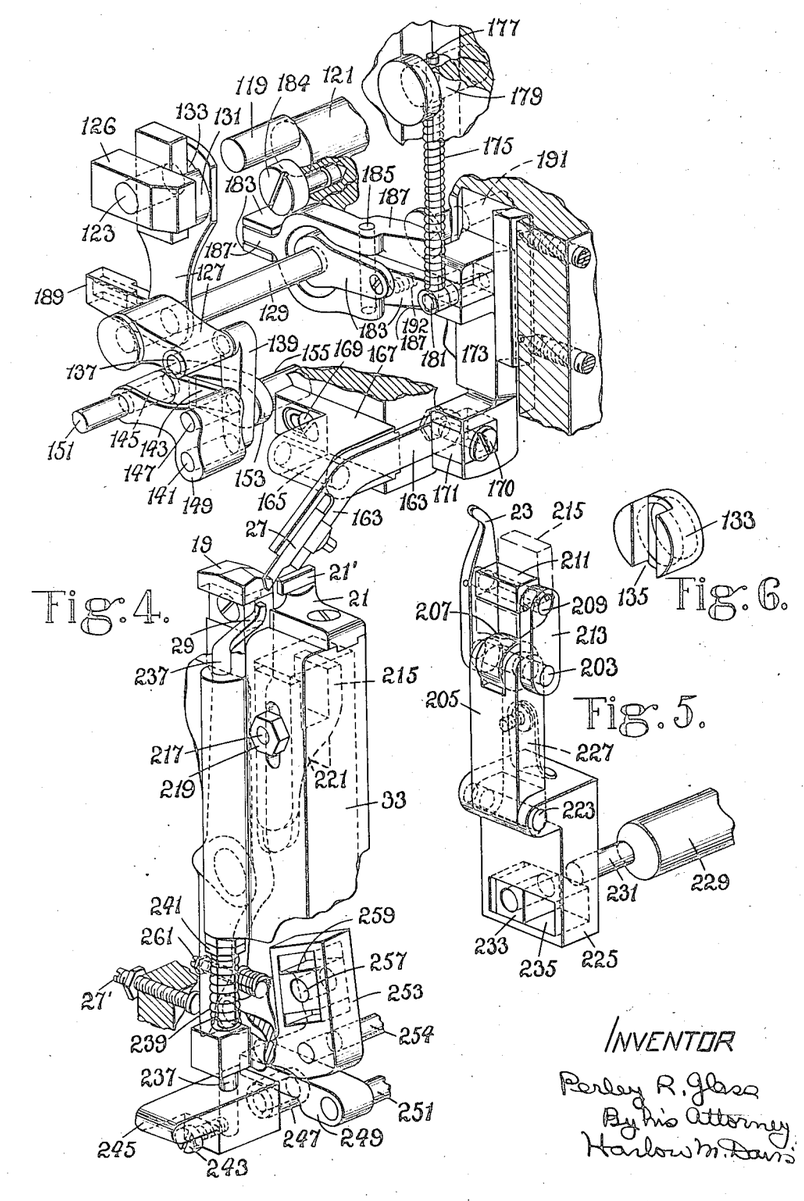
Fig. 4 is a perspective of the mechanism for actuating the hammer and the snipping knife and part of the mechanism for operating the folder and the gripper finger.
Fig. 5 is a perspective of the remaining parts of the mechanism for operating the folder and the gripper finger.
Fig. 6 is a detail in perspective of one of the parts shown in Fig. 4.

Referring now more particularly to Figs. 4 and 5, the mounting of the folder 23, the gripper finger 29 and the anvil 19 will be described. The post 33, over the top of which the work is fed, is in the form of a hollow cap, rectangular in cross-section, open at its rear side and detachably fastened to the base of the frame by screws 201 (Fig. 2). A folder assembly, shown as a whole in Fig. 5, is located partly in the hollow post or cap and is reciprocated vertically therein, mechanism being provided which acts first to move the folder up to wipe the margin upwardly across the edge of the creaser, then to swing the folder and at the same time move it up to cause it to wipe the margin of the work over the upwardly inclined face of the creaser, and then to swing the foldler back and at the same time move it down again. To this end the folder is pivoted at its lower end at 203 to a carrier 205, said pivot having a roll 207 thereon. Near its middle the folder is pivoted at 209 to a rectangular block 211 which is connected at its near end to the near end of the pivot 203 by a link 213. When the parts of the machine are in assembled relation, the folder carrier is located in the cap or hollow post 33 the small block 211 being received between the upright branches of a fork 215 (Figs. 4 and 18) which is adjustably fastened to the cap 33 by a threaded stud 217 and a nut 219, the stud being rigid with the fork and projecting through a vertical slot in a wall of the cap 33. The roll 207 is then located below the fork 215 and will run up a track 221 formed on the fork when the folder carrier 205 is moved up. The folder carrier is pivoted at its lower end at 223 to a slide block 225 which is vertically slidable in guideways in the frame, the folder carrier being acted upon at all times by a leaf spring 227 which holds the roll 207 always against the track 221. The slide 225 is reciprocated vertically by a rotary shaft 229 having a crank pin 231 which extends through a bore in a small block 233, said small block being slidable in a horizontal slot 235 formed in the large block 225. Referring now to Fig. 3 in which the parts are shown in assembled relation, the crank pin 231, and with it the folder 23, are shown in lowermost position. Considering now a single rotation of the shaft 229, the folder will first move up to wipe a portion of the margin across the end of the creaser (Fig. 19); then, as the roll 207 rides up the inclined track 221 (Fig. 20), the folder will rock counterclockwise (Fig. 21) about its pivot 209 while moving up until it has bent the margin of the work over upon the inclined face 25″ (Fig. 18) of the creaser 25 (not shown in Fig. 3) and move up said face; it will then rock clockwise away from the bent-over margin and move down and finally will return to the position shown. A plate 236 fastened to the rear of the post 33 holds the carrier slide and the anvil in place, said plate being cut away to permit the roll 207 to ride up the track 221 and to permit the folder to rock about its pivot 209.

While the fold is being formed by the folder in the manner which has just been described and the hammer is returning preparatory to engaging and feeding the work, the work is held stationary by the gripper finger 29 (Fig. 4) which clamps the work against the under side of the creaser 25. This gripper finger is formed at the upper end of a rod 237 vertically slidable in a boss on the hollow post 33 and is urged upwardly at all times by a coiled spring 239 which rests upon a stationary boss and engages with its upper end the under side of a nut 241 threaded on the rod, said nut limiting the upward movement of the gripper finger by engagement with the bottom of the boss on the post 33 in which the rod is slidable. The spring thus tends always to raise the gripper finger 29 and hold it in operative position. In order to lower the gripper finger at the proper times to release the work so that it may be fed, there is adjustably attached to the lower end of the rod by a set screw 243 a block 245, said block carrying a roll 247 which lies beneath an arm 249 the hub of which is fast to a pivot shaft 251 rotatably mounted in the frame. This block 245 lies between two stationary guides 246 (Fig. 2). The arm 249 is swung down at proper times by the clockwise rocking of a rocker block 253 pivoted about a stud 254 carried by the frame. The rocking of this block is caused by the same crank pin 231 which reciprocates the block 225 of the folder, said crank pin extending not only through the small slide block 233, but also through a bore 257 in a small block 259 which is slidable in an upwardly extending guide slot in the rocker block 253.

The anvil 19 (Fig. 2) is fast to the upper end of a lever 255 the hub of which is fastened by a set screw 256 to a short rockshaft 258 rotatably mounted in the frame. Extending loosely through the lower end of the lever 255 is the stem of a small screw 261, there being a coiled compression spring 263 between the head of the screw and the lever. The small nut 265 on the left-hand end of the screw is not necessary for the operation of the mechanism but prevents the screw from becoming separated from the lever 255 when for any purpose the said lever may be removed from the machine. The head of the screw 261 rests against a small block 267 fastened to a small rockshaft 269. An adjustable stop screw 271 limits the extent that the lower end of the lever 255 may be moved to the left by the compression spring 263 and hence determines the initial position of the anvil 19 preparatory to the descent of the hammer 17 and the feeding of the work. Assuming for the moment that the small block 267 is held stationary, the hammer 17 descends upon the portion of the work which rests upon the anvil to press the fold formed by the cooperating folder and creaser, and then moves to the left carrying the anvil with it against the force of the spring 263. At the end of the feed movement the hammer rises, thus freeing the anvil which is returned to the initial position shown by the spring. The purpose of the small rocking block 267 is to push on the head of the spring-pressed screw 261 at the proper time so as to make sure that the anvil will always be in its initial position, as shown, when the hammer presses the work against it; and to this end the small block 267 is rocked counterclockwise at the proper time by the larger rocking block 253 (Fig. 4). With the parts in the positions shown, the shaft 229 which acts to rock the block 253 is rotating in a direction indicated by the arrow in Fig. 2, the gripper finger 29 is in position to hold the work pressed up against the under side of the creaser 25, and the hammer 17 is about to descend. During the descent of the hammer and before it reaches the work, the block 253 is swung clockwise, thereby swinging the small block 267 counterclockwise, pushing the spring-pressed screw 261 to the left and exerting a push to the left on the lower end of the lever 255, thus ensuring that the anvil 19 is always returned to the initial position shown. Just as the hammer strikes the work the block 253 in its clockwise movement depresses the small arm 249 to pull down the gripper finger 29 so as to release the work prior to the feeding movement of the hammer.

The lower or countershaft 229 (Fig. 1) has fastened to it by a set screw 283 the hub 284 of a sprocket around which, and around a sprocket the hub of which is pinned to the driving shaft 121, runs a chain 285. After the set screw 283 has been loosened it is possible to turn one shaft with respect to the other and thereby to time them properly. The driving shaft 121 is driven in a manner presently to be described so that the moving parts of the machine will always come to rest with the hammer raised and the folder lowered to facilitate the presentation of work to the machine.

As has been explained, the machine, fitted as shown in Figs. 1 to 8, is designed to fold the margin of a leather or fabric shoe part, the work being fed from right to left, as viewed in Fig. 2. The margin of the moving work is given a preliminary upward bend as it moves past the gage 21, the extent to which the margin is bent up being determined by contact of the edge of the work with the under face of a small bar 21' (Fig. 4) which is integral with the gage 21 and overhangs the curved face of said gage, the upwardly bent margin of a piece of work 300 extending into the space (Figs. 8 and 22) defined by the gage 21, the gage finger 37 and the creaser 25. During the succeeding pause of the intermittent feed of the work, during which it is held stationary by the gripper finger 29 (Fig. 3), the folder 23 first moves up to draw or wipe a portion of the margin of the work across the edge of the creaser. Then, while the folder is still moving up, it swings counterclockwise about the pivot 209 to pull the margin tightly about the edge of the creaser and thereby form the fold. The hammer descends to press the fold. The work is released by the gripper finger, and the hammer feeds the work, releases it and returns to initial position. The folder returns to the position shown, the gripper finger grips the work again, and all the parts are once more in the position shown ready to repeat the cycle of operations.

Referring to Fig. 5, it will be seen that the folder 23 is carried by a toggle mechanism one lever of which is the block 205 and the other lever of which is constituted by the stem of the folder and the link 213 which are connected at their upper ends by the pivot 209. The pivot 203 is the knuckle of the toggle, the roll 207 on the pivot and the leaf spring 227 causing this knuckle to move bodily in a path determined by the cam track 221 when the toggle mechanism is moved up and down and thereby to swing the folder 23 about its pivot 209. The movement thus imparted to the folder is extremely effective. Referring to Figures 18 to 21, Fig. 18 shows in section a piece of leather 300 the margin of which has been skived as usual, said margin having been bent up somewhat by the gage 21, not shown. The gripper finger 29 is holding the leather against the under side of the creaser adjacent to the edge thereof; and the folder 23 is in its initial lowered position. The folder first moves straight up (Fig. 19) to pull the portion of the margin along the fold line up across the edge of the creaser. The folder then moves up and to the left to pull the remaining portion of the margin over and to lay it down upon the inclined face 25'' (Fig. 18) of the creaser, passing through the positions shown in Figs. 20 and 21 as it does so and moving in a direction parallel to the inclined face 25'' of the creaser. The parts are so proportioned and the movements of the folder are so made that the margin is gripped at all times between the creaser and the folder with sufficient force so that the margin of the leather is pulled tight about the edge of the creaser and laid smoothly upon the inclined face 25''.

When French binding is to be folded the gage 21 is removed and replaced by a small flat plate as has been explained above, this work being guided by a gage finger 42 in the manner shown in Fig. 12. With such work the folder 23 cooperates with the creaser in the same manner which has been described above in connection with the folding of the margin of the piece of leather.

Referring to Fig. 23 wherein is shown a shoe quarter 400 having therein two ornamental openings 500, the margin along the edge of one of these openings has been snipped and folded. When a piece of work of this kind is being operated upon, the finger piece 63' (Fig. 1) is depressed to lift the gage finger 37 and the creaser 25 sufficiently to permit an ornamental opening in the work to be threaded over the gage 21, and then the finger piece 63' is released and the margin along the opening is folded. It should be noted that the machine is particularly adapted for this kind of work because (1) the gage 21, the creaser 25, the gripper finger 29 and the snipping knife 27 are crowded into a very small space, and (2) the construction of the machine is such that a free and unobstructed space is provided to permit the work to be swung freely in a manner to permit the folding of the margin along the endless edge of the opening. This space and proper cooperation of the work-engaging parts are secured by providing the post 33 of small cross-section and by mounting some of the work-engaging parts upon the outer end of the overhanging arm and others upon the post in the manner shown. It should be noted that since the stem of the hammer is mounted for vertical reciprocation this stem does not interfere in any way with the swinging of the work.

The shaft 121 of the machine is driven at comparatively high speed and is so connected with its driving mechanism that, when power is withdrawn from it, it comes to rest always in the same angular position, this position being such that the hammer is raised and the folder is lowered, as has been indicated above. Referring to Figs. 14 to 17, the manner in which the rotation of the shaft 121 is controlled will be described. This shaft, which is driven through a clutch of the well-known Horton type, has pinned to it a collar 301 having a hub 301' provided on its periphery with a plurality of cam tracks with which cooperate rolls 303 carried by a roll cage 305 which encircles the hub and has a loose connection therewith by pins 307 carried by the collar 301 and projecting in the slots 309 in the roll cage. The purpose of this connection is to limit the relative movement of cage 305 and collar 301 and also serves to hold the hub and the roll cage in assembled relation if these parts are removed from the machine. Surrounding the roll cage is a cylindrical extension 311 (Fig. 14) projecting from the left-hand face of the driving pulley 313 which has its hub rotatably mounted on the shaft 121. A tension spring 315 acts, when permitted to do so, to rotate the roll cage forwardly with respect to the shaft and to cause the rolls to ride upon the cams on the hub 301' until they are wedged between these cams and the inner surface of the cylindrical extension 311, whereupon the shaft is driven by the pulley. In the position of rest shown in Fig. 15, the shaft 121 is free from the pulley by reason of the fact that a stop arm or controller 317, movable in a plane normal to the shaft, has engaged a lug 319 on the roll cage while the parts were already rotating and stopped the rotation of the cage thereby disconnecting the driving pulley from the shaft. When the stop arm 317 was moved into this position, a pawl 321 was moved yieldingly into contact with the periphery of the collar 301 which has teeth 323 formed thereon. After the roll cage was stopped, the momentum of the driven parts continued the rotation of the collar 301, put the spring 315 under increased tension and carried the teeth 323, or some of them, past the pawl 321. When the momentum of the driven parts had been exhausted in applying tension to the spring 315, the forward rotation of these parts stopped, and the spring then rotated the shaft and collar backward until the pawl 321 engaged one of the small teeth 323 as shown. The clutch mechanism, as thus far described, is old and well-known, and any suitable clutch mechanism controlled in a manner presently to be described may be employed.

The stop arm 317 is adjustably fastened to a lever 325 pivoted at 327 to the frame; and the pawl 321 is similarly fastened to a lever 329 pivoted at 331 to the frame. A tension spring 333 connects the stop arm and the pawl, and an abutment screw 335 threaded through the inner end of the lever 325 engages the under side of the inner end of the lever 329. The outer end of the lever 325 is pivoted at 337 to the upper end of a rod 339 which is urged upwardly at all times by a spring, in a manner presently to be described. Thus with the construction, as thus far described, if the rod 339 is pulled down, the stop arm 317 and the pawl 321 are both withdrawn from operative position and the clutch is thrown in to connect the pulley 313 with the shaft 121; and if the rod is released the stop arm and the pawl are moved into the operative position shown to throw out the clutch and stop the shaft always in the same angular position.

Figures 14, 15, 16, 17:
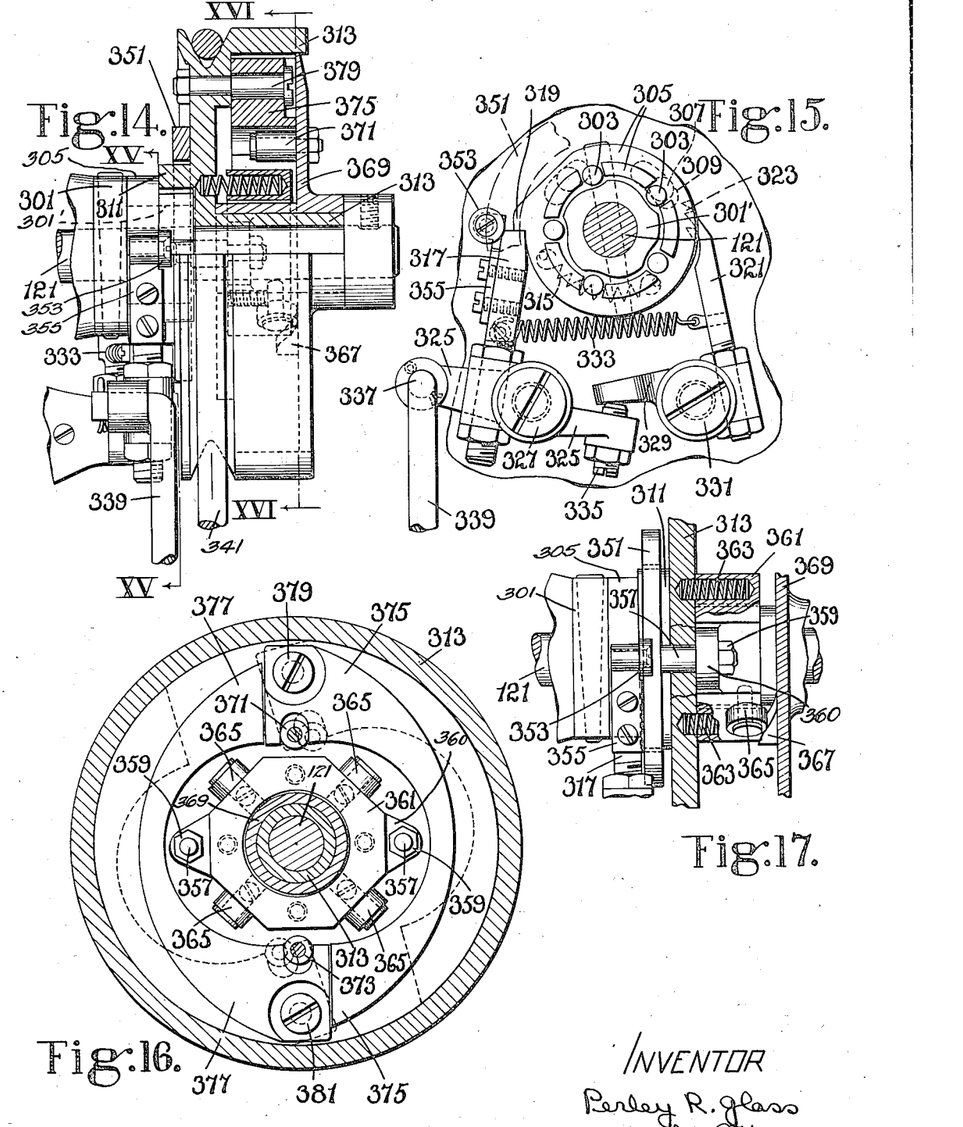
Fig. 14 is an elevation of the mechanism for controlling the rotation of the driving shaft, parts of the upper portions of this mechanism being shown in section.
Fig. 15 is a section on the line XV—XV of Fig. 14.
Fig. 16 is a vertical section on the line XVI—XVI of Fig. 14.
Fig. 17 is a detail partly in section and partly in elevation of a part of the controlling mechanism.

As has been stated, the shaft 121 is rotated at high speed, for example, 1000 or more R. P. M. It is not feasible, however, to throw out the clutch and stop the rotation of the shaft in the manner which has been described above if the shaft is rotating at high speed. In order to overcome this difficulty, mechanism is provided for applying power to the pulley 313 through a belt 341 to rotate it at high speed when the stop arm 317 is swung out and for preventing the stop arm from returning to the position shown after power has been withdrawn from the pulley 313 and the stop arm released until the pulley has slowed down to a comparatively low speed, for example, 350 R. P. M. The treadle-controlled mechanism for applying power to the pulley 313 and at the same time pulling down the rod 339 and for releasing the rod 339 and withdrawing power from the pulley will be described later. When the treadle of this mechanism is depressed, it acts first to withdraw the stop arm 317 to throw in the clutch and then to apply power to the pulley 313 to rotate it at high speed. This starts the rotation of the shaft 121 at high speed almost instantly. When it is desired to stop the rotation of the shaft 121, the treadle is released, whereupon a spring (to be described later) rocks the treadle sufficiently to withdraw power from the pulley 313 and would rock it far enough to allow the rod 339 to swing the stop arm 317 into position to engage the lug 319 (Fig. 15) on the roll cage if permitted to do so. This arm 317, however, is held out in inoperative position until the shaft 121 slows down to a given speed, for example 350 R. P. M. In order to prevent the return of the stop arm 317 to operative position while the shaft 121 is rotating at high speed, a ring 351, which is normally in the position shown in Fig. 14, is moved by the action of centrifugal force, as soon as the shaft 121 attains a speed greater than 350 R. P. M., longitudinally of the shaft 121 into the position shown in Fig. 17, and remains in this position as long as the shaft continues to rotate at such a velocity. In this position, the ring is in the path of a small roll 353 carried by a small bar 355 which is rigid with the stop arm 317, so that the stop arm, upon release of the treadle, will be held by the ring from swinging in and engaging the lug 319 of the roll cage. When, however, the shaft 121 slows down sufficiently, springs 363, to be described, overcome the reduced centrifugal force and move the ring 351 out from under the roll 353. The stop arm 317 will then be permitted to swing in and the shaft will be brought to rest when the lug 319 strikes the arm 317.

The ring 351 has projecting horizontally from it two studs 357 (Figs. 16 and 17) which are slidable through bores in the wall of the pulley 313. The studs have threaded outer ends of reduced diameter provided with nuts 359; and between these nuts and the shoulders of the studs are clamped two ears 360 formed on a block 361. Located partly in sockets in the block (Figs. 14 and 17) and partly in alined sockets in the wall of the pulley are a plurality of compression springs 363 (to which reference has been made before) which tend at all times to move the ring 351 into, and to hold it in, the inoperative position shown in Fig. 14. In order to move the ring longitudinally of the shaft into the operative position shown in Fig. 17, the block 361 carries four small rolls 365 which are adapted to be engaged respectively by four wedges (one of which is shown at 367 in Figs. 14 and 17) carried by a disk 369 the hub of which is rotatably mounted on the hub of the pulley 313. When, therefore, the disk 369 is rotated through a small distance on the hub of the pulley, these wedges engage the rollers and push the ring 351 to the left into the position shown in the last-named figure.

This small movement of rotation of the disk 369 is caused by means of centrifugal force generated by the rotation of the shaft 121 whenever the rate of rotation is above 350 R. P. M. When the shaft and pulley slow down to 350 R. P. M. the springs 363, through the wedges 367, act to turn the disk 369 back to initial position and to return the ring 351 to inoperative position. The disk 369 carries on its inner face two diametrically opposite rolls 371, 373 which are received in recesses formed respectively in two weighted arms 375, 377 pivoted respectively at 379, 381 to the pulley. These two arms are shown in Fig. 16 in full lines in the positions which they occupy when the shaft 121 is at rest and in dotted lines in the positions which they occupy when the shaft is rotating at more than 350 R. P. M. In their movements from full to dotted line positions, they turn the disk 369 somewhat upon the shaft 121 and the wedges 367 push the ring 351 to the position shown in Fig. 17. Although, for convenience, the lower limit of speed of the shaft 121 has been stated to be 350 R. P. M., it should be noted that this limit depends upon the strength of the springs 363 so that by replacing the springs with others of different strength, the lower limit of speed may be varied.

Figures 1A, 1B:
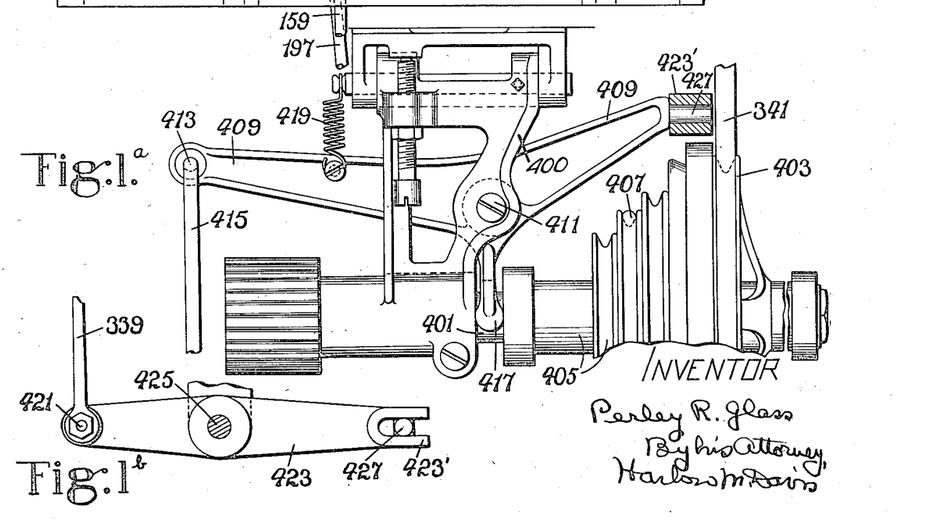
Fig. 1a is an elevation of the friction transmitter for starting and stopping the machine.
Fig. 1b is an elevation of a portion of the treadle-controlled part of the transmitter.

Referring now to Fig. 1a the treadle-controlled mechanism for first applying power to and then withdrawing power from the pulley 313 and for first pulling down and then releasing the rod 339 will be described. This mechanism comprises a friction transmitter of usual form which is adapted to be bolted to the under side of the bench upon which the folding machine rests. It comprises a frame 400 having mounted therein a rotary shaft 401 having fast thereto a pulley 403 to receive the belt 341 and loose thereon a three-step pulley 405 which is driven continuously by a belt 407 from any suitable source of power. A lever 409 pivoted near its middle at 411 to the frame and at its outer end at 413 to a treadle rod 415 has a depending fork 417 which straddles the shaft 401 and engages the hub of the stepped pulley 405. A tension spring 419 normally holds the lever 409 in the position shown in which the cooperating friction faces of the stepped pulley 405 and the pulley 403 are not in engagement. When now the treadle (not shown), which is attached to the lower end of the treadle rod 415, is depressed, the fork 417 pushes the stepped pulley 405 to the right and connects it frictionally with the pulley 403 to apply power to said last-named pulley; and, when the treadle is released, the parts return to the positions shown and power is withdrawn from the pulley 403. The construction and mode of operation of the friction transmitter, as thus far described, are old and well known.

The lower end of the rod 339 (Fig. 1b) is pivoted at one end at 421 to one end of a horizontal lever 423 which extends at right angles to the shaft 401. This lever is pivoted near its middle at 425 to a stationary member and has at one end a fork 423' to receive a pin 427 carried at the inner end of the lever 409. With this construction, when the treadle (not shown) which is connected to the lower end of the treadle rod 415 is depressed, power is applied to the pulley 313 and the clutch between the pulley 313 and the shaft 121 is thrown in; and, when the treadle is released, power is withdrawn from the pulley 313 and the rod 339 is urged yieldingly upward by the spring 419 so that the clutch will be thrown out as soon as the shaft 121 slows down to 350 R. P. M.

Although the invention has been set forth as embodied in a particular machine, it should be understood that the invention is not limited in the scope of its application to the particular machine which has been shown and described.

Certain subject-matter disclosed in this application is also disclosed in application Serial No. 629,181, filed August 17, 1932, in the name of Walter E. Naugler; and all subject-matter common to the two applications is claimed in the prior application.

Having thus described my invention, what I claim as new and desire to secure by Letters Patent of the United States is:

1. A machine of the class described having, in combination, a post of small cross-section over the top of which the work is fed, there being a free and unobstructed space around said post, an arm overhanging the post, and mechanism for feeding the work, forming a fold in the margin thereof and pressing the fold, said mechanism including a creaser mounted on the arm and a cooperating folder for bending the margin of the work about the creaser mounted for movement on the post to carry the work-contacting end of the folder upwardly in one direction and then inwardly over the creaser in another direction.

2. A machine of the class described having, in combination, a post of small cross-section over the top of which the work is fed, there being a free and unobstructed space around said post, an arm overhanging the post, and mechanism for feeding the work, forming a fold in the margin thereof and pressing the fold, said mechanism including a hammer or fold-presser having a stem mounted on said arm for both reciprocation and oscillation, and a cooperating anvil mounted to oscillate on said post, said hammer and anvil being constructed and arranged to feed the work.

3. A machine of the class described having, in combination, a post of small cross-section over the top of which the work is fed, there being a free and unobstructed space around said post, an arm overhanging the post, and mechanism for feeding the work, forming a fold in the margin thereof and pressing the fold, said mechanism including a creaser and a hammer each having a vertically reciprocating stem, said creaser and hammer being mounted on said arm, and an anvil which cooperates with the hammer and a gripper finger which cooperates with said creaser, said anvil and finger being mounted on said post, said anvil and hammer being also mounted for movement laterally and constructed and arranged to feed the work.

4. A machine of the class described having, in combination, a post of small cross-section over the top of which the work is fed, there being a free and unobstructed space around said post, an arm overhanging the post, and mechanism for feeding the work, forming a fold in the margin thereof and pressing the fold, said mechanism including a creaser and a hammer mounted on said arm, a folder which cooperates with the creaser and an anvil which cooperates with the hammer, both said folder and said anvil being movably mounted on said post.

5. A machine of the class described having, in combination, means for feeding the work and for pressing the fold, a creaser to determine the line of fold, a folder for forming the fold by bending the margin of the work over the creaser, and means for causing the folder first to press the margin in the locality of the fold line against and pull it up past the edge of the creaser and then to change its direction of movement and press the remaining portion of the margin against a face of the creaser and to lay it down upon said face.

6. A machine of the class described having, in combination, means for feeding the work and for pressing the fold, a creaser to determine the line of fold, a folder normally located below the level of the plane of the work, and means for causing the folder first to move up past the edge of the creaser and then to move in another direction over the creaser while still moving upward.

7. A machine of the class described having, in combination, means for feeding the work and for pressing the fold, a creaser to determine the line of fold, said creaser having an edge and a face inclined upwardly from said edge, a folder normally located below the level of the plane of the work, and means for causing the folder first to move up past the edge of the creaser and then to move in another direction substantially parallel to said inclined face.

8. A machine of the class described having, in combination, means for feeding the work intermittently and for pressing the fold, a creaser for determining the line of fold, said creaser having an edge and a face inclined upwardly from said edge, a gripper for engaging the under side of the work close to the edge of the creaser during the pauses in the feed, a folder and means acting first to move the folder substantially straight up past the edge of the creaser and then up the inclined face thereof.

9. A machine of the class described having, in combination, means for feeding the work and for pressing the fold, a creaser, a cooperating folder, a pair of toggle levers by one of which the folder is carried, means for reciprocating the levers in unison, and means for moving the knuckle of the joint in a direction transverse to the path of reciprocation.

10. A machine of the class described having, in combination, means for feeding the work and for pressing the fold, a creaser, a cooperating folder, a pair of toggle levers by one of which the folder is carried, means for reciprocating the levers in unison, means for moving the knuckle of the joint in a direction transverse to the path of reciprocation, and adjustable means for varying the time of movement of the knuckle with respect to the reciprocation.

11. A machine of the class described having, in combination, means for feeding the work and for pressing the fold, a creaser and a cooperating folder for forming the fold, a pivot upon which the folder is mounted, means for moving the pivot in a substantially straight path, and means for swinging the folder about the pivot during such movement to carry the operative end of the folder in another path.

12. A machine of the class described having, in combination, means for feeding the work and for pressing the fold, a creaser and a cooperating folder for forming the fold, a pivot upon which the folder is mounted, means for reciprocating the pivot, and means for swinging the folder about the pivot during such movement to change the path of the work-engaging end of the folder.

13. A machine of the class described having, in combination, means for feeding the work and for pressing the fold, a creaser, a cooperating folder, a pair of toggle levers by one of which the folder is carried, a block pivoted to the other lever, means for reciprocating the block, a roll mounted on the pivot which connects the toggle levers, a track for the roll, and yielding means for holding the roll in contact with the track.

14. A machine of the class described having, in combination, mechanism for feeding the work, for forming a fold in the margin thereof and for pressing the fold, said mechanism including a hammer, a rotary shaft for operating the hammer, a driver therefor, means for applying power to said driver to rotate it at a given rate and for withdrawing power therefrom, means for stopping the shaft always in the same angular position with the hammer raised, and means for holding the stop means inoperative, after power has been withdrawn from the driver, until the shaft has slowed down to a lower rate of rotation.

15. A machine of the class described having, in combination, mechanism for feeding the work, for forming a fold in the margin thereof and for pressing the fold, said mechanism including a hammer, a rotary shaft for operating the hammer, a driver for the shaft, a clutch between the driver and the shaft constructed and arranged, when thrown out, to stop the shaft always in the same angular position with the hammer raised, means for applying power to the driver and for withdrawing power therefrom, means for throwing the clutch in and out, and means controlled by the rate of rotation of the shaft, when the clutch has been thrown in, for preventing the clutch from being thrown out, upon withdrawal of power from the driver, until the shaft has slowed down to a predetermined rate of rotation.

16. A machine of the class described having, in combination, mechanism for feeding the work, for forming a fold in the margin thereof and for pressing the fold, said mechanism including a hammer, a folder, a rotary shaft for operating the hammer and the folder, a driver for the shaft, a clutch between the driver and the shaft constructed and arranged, when thrown out, to stop the shaft always in the same angular position with the hammer raised and the folder lowered, means for applying power to the driver and for withdrawing power therefrom, means for throwing the clutch in and out, and means controlled by the rate of rotation of the shaft, when the clutch has been thrown in, for preventing the clutch from being thrown out, upon withdrawal of power from the driver, until the shaft has slowed down to a predetermined rate of rotation.

17. A machine of the class described having, in combination, means for feeding the work, for forming a fold in the margin thereof and for pressing the fold, a pivotally mounted snipping cutter, a slide block connected thereto in such manner that reciprocating the block vibrates the cutter, a continuously vibrating actuator, and means for connecting the block with the actuator and for disconnecting it therefrom at will.

18. A machine of the class described having, in combination, a frame, means for feeding the work, for forming a fold in the margin thereof and for pressing the fold, a snipping cutter pivoted on the frame, a slide block connected thereto in such manner that reciprocating the block vibrates the cutter, a continuously vibrating actuator, and means for connecting the block with the actuator and for disconnecting it therefrom at will, said means being constructed and arranged to permit the actuator to be connected with the snipping cutter only at times when the vibrating actuator is momentarily stationary at a reversal of its direction of movement.

19. A machine of the class described having, in combination, means for feeding the work, means for forming a fold in the margin thereof, and means for pressing the fold, said machine comprising a frame having fixed locating members, a unit comprising part of the fold-forming means having members adapted to engage detachably the locating members on the frame, and a removable plate engaging the unit to hold said members in engagement, whereby upon removal of the plate the unit may be removed and replaced by another unit.

20. A machine of the class described having, in combination, means for feeding the work, means for forming a fold in the margin thereof, and means for pressing the fold, said machine comprising a frame having fixed locating members, a creaser unit suitable for use in folding leather having members adapted to engage detachably the locating members on the frame, and a removable plate engaging the unit to hold said members in engagement, whereby upon removal of the plate the unit may be removed and replaced by another unit suitable for use in folding French binding work.

21. A machine of the class described having, in combination, means for feeding the work, means for forming a fold in the margin thereof, and means for pressing the fold, said fold-forming means including a creaser, a pivot on which the creaser is mounted, operator-controlled means for raising the pivot in a substantially vertical path, an upwardly extending arm on the creaser having an inclined face, and a stationary member adapted to contact with said face during the raising of the pivot and to swing the creaser about its pivot.

PERLEY R. GLASS.